W. FRIESE-GREENE.
COLOR PHOTOGRAPHY.
APPLICATION FILED JAN. 31, 1921.
1,383,460.
Patented July 5, 1921.
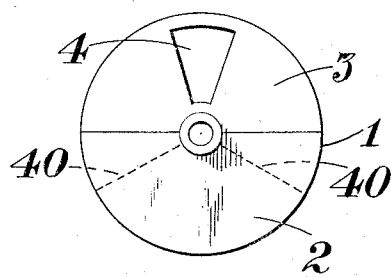
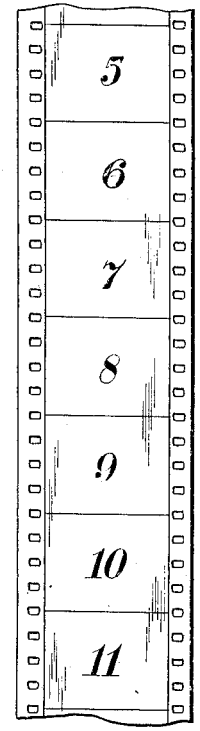
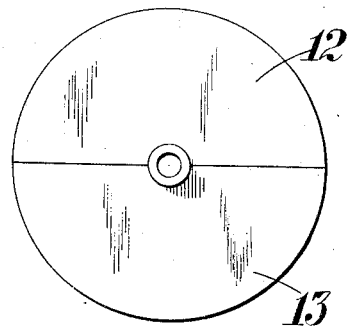
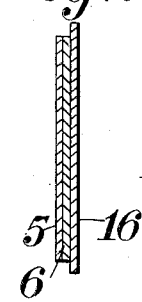
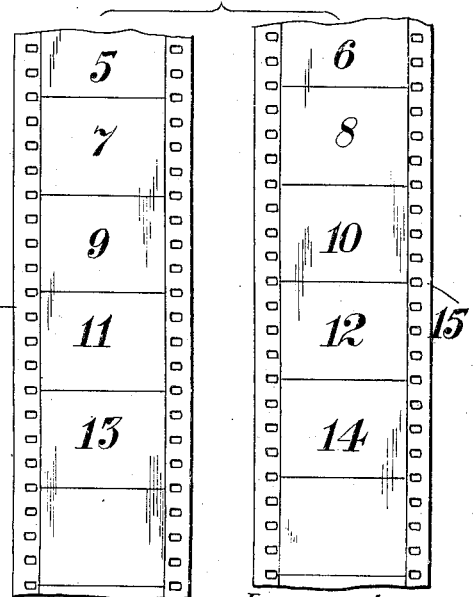

UNITED STATES PATENT OFFICE.

WILLIAM FRIESE-GREENE, OF LONDON, ENGLAND, ASSIGNOR TO COLOUR PHOTOGRAPHY LIMITED, OF LONDON, ENGLAND.

COLOR PHOTOGRAPHY.

1,383,460.  Specification of Letters Patent.  Patented July 5, 1921.

Application filed January 31, 1921. Serial No. 441,496.

*To all whom it may concern:*

Be it known that I, WILLIAM FRIESE-GREENE, a subject of the King of England, residing in London, England, have invented certain new and useful Improvements in Color Photography, (for which I have filed applications in England, September 25, 1918, No. 5,162, June 4, 1919, No. 14,132, June 10, 1919, No. 14,631; in Canada September 8, 1919, No. 233,031, and in France September 25, 1919, No. 504,232,) of which the following is a specification.

This invention is for improvements in or relating to a process particularly adapted for the preparation of cinematograph films for the subsequent projection of motion pictures in color therefrom. The process is a two-color process, and, according to the present invention, consists in preparing pairs of negatives on a single light-sensitive surface, such as a cinematograph film, by exposing them in succession respectively to direct white light and through a colored screen (for example a flavazin screen), preparing positives therefrom and thereafter coloring the positives so obtained or projecting them through colored screens substantially in the following manner.

The entire positive surface obtained from the negative exposed directly to white light is colored approximately blue-green or is projected through a blue-green screen, and the other positive surface is colored, or is projected through a screen colored approximately orange-pink or other color of reddish-shade.

The present invention also includes means by which alternate exposures for the preparation of the negatives may be made in succession directly to white light and through a yellow color-screen or filter respectively.

Conveniently, for this purpose a disk of transparent material (for example celluloid) is stained over one half with the color required for the color-screen, and is rendered opaque over the other half (for example by painting) and has a narrow slit in the opaque portion; this slit is preferably diametrically opposite to the middle of the stained portion of the disk.

The invention will be understood more clearly from the following detailed description read in conjunction with the accompanying drawings, in which—

Figure 1 illustrates a disk-shutter according to the invention;

Fig. 2 illustrates a portion of a colored film;

Fig. 3 shows a disk-shutter used in the projection of pictures in color from a cinematograph apparatus;

Fig. 4 illustrates cinematograph film strips according to a feature of the invention; and Figs. 5 and 6 represent two methods of mounting picture records in register with one another.

In the preferred method of carrying the invention into effect, the sensitized surface of a cinematograph film is specially color-sensitized by the process and in the manner described in my United States patent application Serial No. 309,455; that is to say, broadly speaking, it is sensitized by means of a solution comprising pinacyanol, pinachrome, pinaverdol, flavazin and ammonia mixed with water. Alternatively, any other preferred form of panchromatic film may be employed.

The film is exposed in an ordinary cinematograph camera, fitted with a special shutter by means of which alternate exposures such as 5, 7, 9, 11, Fig. 2, are made direct to white light and the others, such as 6, 8, 10 and so on through a colored screen or filter respectively. For this purpose either in front of or behind the usual shutter in the camera there is a disk 1 (Fig. 1) of celluloid or other transparent material which is stained over one half 2 with the required color for the colored filter. The other half 3 is preferably opaque, and has in it a narrow slit 4. The disk is revolved with the shutter of the camera to expose successive portions of the film in the manner above described, viz., alternately to white light and through a color screen. The ratio of the width of the slit to that of the stained surface of the color-screen is conveniently 1:5. It is found with this arrangement that the picture taken through the slit is very sharp and that taken through the color-screen is not quite so sharp.

In the preferred form the color screen is preferably transparent celluloid coated with gelatin containing flavazin by the use of the following dye solution:—

Flavazin _____ 1 oz.
Water _____ 10 ozs.

in which the screen previously coated with gelatin, is immersed until it obtains the required color density.

After the film has been exposed, it is developed in the ordinary way, and a positive is prepared therefrom. The alternate exposures are then colored in the manner referred to at the commencement of the specification. The colored film can then be projected from an ordinary cinematograph apparatus.

For coloring, the following solutions are preferred:—

For the blue-green positive:—

Victoria blue _____ ¼ oz.
Patent blue _____ ¼ oz.
Naphthol green _____ ½ oz.
Water _____ 10 ozs.

For the orange-pink positive:—

Rose bengal _____ ½ oz.
Flavazin _____ ½ oz.
Water _____ 10 ozs.

All the foregoing chemical ingredients are obtainable from the manufacturers, under the trade names employed above.

Otherwise the ingredients are as follows:—

Victoria blue is classed as a triphenylmethane dye but is properly a derivative of diphenylnaphthylmethane, i. e. one of the three phenyl groups of the former class has been replaced by a naphthyl group. It is prepared by condensing tetramethyldiaminobenzophenone with phenyl-a-naphthylamin by the aid of phosphorous oxychlorid.

Patent blue, which is also a triphenylmethane dye is a disulfonic acid derivative of oxytetraethyldiaminotriphenylmethane. The dye is a calcium salt, sometimes the magnesium derivative. It is prepared by condensing metahydroxybenzaldehyde with a substituted anilin such as diethylanilin or ethylbenzylanilin. This product is sulfonated and the sulfonic acid neutralized to form the calcium salt. The product is then oxidized whereby the dye is obtained.

Naphthol green B is a nitroso dye, and is prepared by treating Shaeffer's B-acid (B-naphtho-monosulfoacid) with nitrous acid, whereby Gambine Y-sulfoacid is obtained, and this, on treatment with a ferrous salt, gives the dye known as naphthol green B.

Rose bengal. This again is triphenylmethane dye of the sub-class—the phthaleins. It is prepared by treating dichlorfluorescein with iodin, four atoms of the latter entering the resorcin groups. The two chlorin atoms are in the phthalic acid nucleus. The dye is generally the potassium derivative.

Flavazin, is one of the few important dyes belonging to the small class of pyrazolone dyestuffs, and is a dye similar to tartrazin.

The names of these dyes are in general use and are the names of commerce as well as of scientific treatises, see for example *Chemistry of the Coal Tar Dyes* (Fay); *Synthetic Dyestuffs and Intermediate Products* (Cain and Thorpe); and *Dictionary of Applied Chemistry* (Thorpe).

Instead, however, of coloring the film itself, a black and white positive film can be projected from a cinematograph apparatus fitted with a revolving tinted screen, Fig. 3, whereof one half 12 is colored approximately blue-green and the other half 13 is of the approximate orange-pink or reddish shade previously stated, so that the pictures are projected through the colors in the manner also set forth at the commencement of the specification.

It is to be understood that the revolving disks provided with a slit and a colored part, Fig. 1, may be used in place of the usual shutter, the portion of the disk between the slit and the coloring being blackened or otherwise rendered opaque, for example, from the edges of the slit 4 as far as the dotted lines 40.

Instead of projecting the pictures from a single strip, such as is shown in Fig. 2 in which the pictures of one color value alternate with those of the other color value two positives may be prepared from the original negative strip one, such as 14 in Fig. 4, containing all the pictures of the one series, as 5, 7, 9, and so on, and the other 15 containing all the pictures, as 6, 8, and so on, of the other series. The images of these two positive strips may be toned and mounted superimposed with the pictures of one series in register with the pictures of the other series, (as, for example, by superimposing pictures 5, 7, 9 over pictures 6, 8, 10 respectively,) those positive images from the negative exposed to white light being toned a reddish tint and the other set being toned blue-green.

Alternatively positives obtained from an adjacent pair of negative pictures or exposures, for example, 5 and 6, may, after coloring, in the manner described above, be mounted in register on a backing 16, Fig. 5, such as an opaque sheet of paper. In the case of an opaque sheet they will be mounted both on the one side of the sheet but in the case of a transparent sheet they can be either both on the one side as in Fig. 5, or one on each side, as in Fig. 6, The present application is a continuation in part of my application Serial No. 309,455, filed July 8, 1919.

What I claim as my invention and desire to secure by Letters Patent is:—

1. A two-color photographic process which consists in preparing pairs of negatives on successive portions of a single light-sensitive surface by exposing the negatives of a pair in succession respectively to direct white light and through a yellow color-screen of a color value substantially equivalent to that of a screen composed of flavazin, preparing positives therefrom, and thereafter exhibiting the positives in color, the color from the positive prepared from the negative which was exposed directly to white light being approximately blue green and the color for the other positive being approximately of a reddish shade.

2. A two-color photographic process which consists in preparing pairs of negatives on successive portions of a single light-sensitive surface by exposing the negatives of a pair in succession respectively to direct white light and through a screen colored with flavazin, preparing positives therefrom and thereafter exhibiting the positives in color, the color for the positive prepared from the negative which was exposed directly to white light being approximately blue green and the color for the other positive being approximately of a reddish shade.

3. A two-color photographic process which consists in preparing pairs of negatives on successive portions of a single light-sensitive surface by exposing the negatives of a pair in succession respectively to direct white light and through a yellow color-screen, preparing positives therefrom and thereafter exhibiting the positives in color, the color of the positive prepared from the negative which was exposed directly to white light being approximately blue-green and prepared from a mixture of Victoria blue, patent blue, naphthol green and water, and the color for the other positive being approximately orange-pink and prepared from a mixture of rose bengal, flavazin and water.

4. A two-color photographic process which consists in preparing pairs of negatives on successive portions of a single light-sensitive surface by exposing the negatives of a pair in succession respectively to direct white light and through a screen composed of flavazin, the light-sensitive surface being color-sensitized with pinacyanol, pinaverdol, pinachrome, flavazin and ammonia mixed with water, preparing positives therefrom and thereafter exhibiting the positives in color, the color for the positive prepared from the negative which was exposed directly to white light being approximately blue-green and the color for the other positive being approximately of a reddish shade.

5. A two-color photographic process which consists in preparing pairs of negatives on successive portions of a single light-sensitive surface by exposing the negatives of a pair in succession respectively to direct white light and through a screen composed of flavazin, the light-sensitive surface being color-sensitized with pinacyanol, pinaverdol, pinachrome, flavazin and ammonia mixed with water, preparing positives therefrom and thereafter exhibiting the positives in color, the color for the positive prepared from the negative which was exposed directly to white light being obtained by means of a solution consisting of Victoria blue, patent blue and naphthol green and the color for the other positive being obtained by means of a solution containing rose bengal and flavazin.

In testimony whereof I affix my signature.

WILLIAM FRIESE-GREENE.